Dec. 5, 1933. K. E. LYMAN 1,938,539
TIRE CONSTRUCTION
Filed April 18, 1932
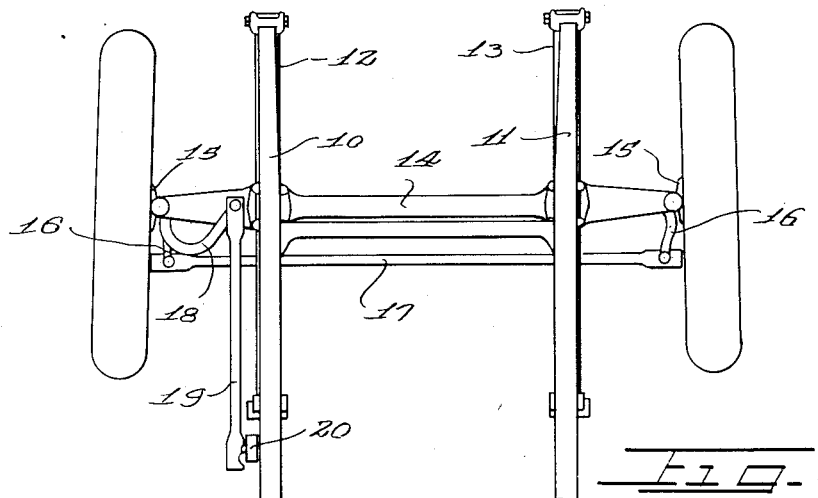
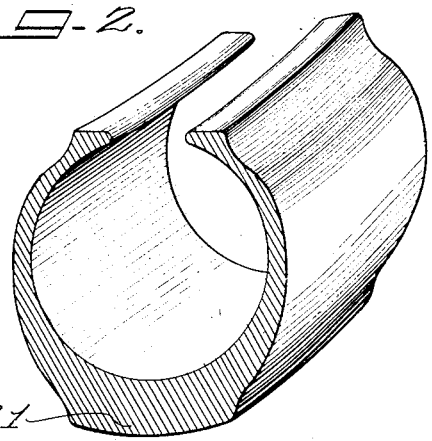
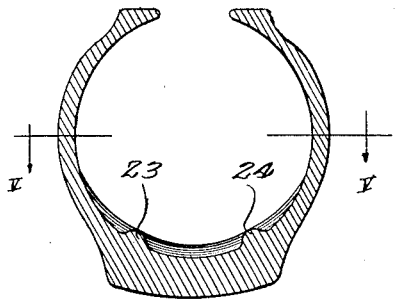
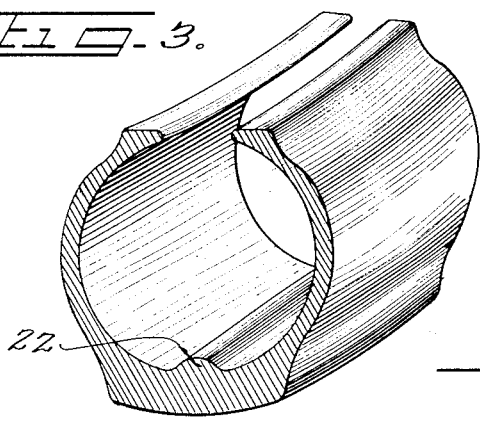
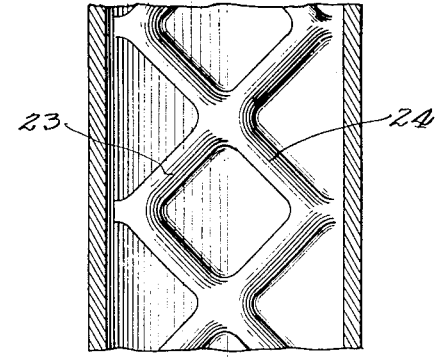
Inventor
Kenneth E. Lyman.
by Charles H. Niles Attys Patented Dec. 5, 1933

1,938,539

UNITED STATES PATENT OFFICE 1,938,539

TIRE CONSTRUCTION

Kenneth E. Lyman, Chicago, Ill., assignor to Borg-Warner Corporation, Chicago, Ill., a corporation of Illinois Application April 18, 1932. Serial No. 605,849

3 Claims. (Cl. 152—13)

This invention relates in general to improvements in the construction of tires for vehicles such as automobiles and the like, and is particularly concerned with tires for the front wheels of an automobile with reference to their relation to the so called shimmy or wobble of the front wheels.

There have been complex theories advanced as to the causes of shimmy or wobble and the manner in which the vibrations that are set up may be overcome or at least substantially eradicated. Whatever may be the cause, the question of shimmy is of great importance, since the disturbing vibrations are not only a source of discomfort, which detract from the pleasures of motoring, but may attain a dangerous violence either by reason of resonant conditions or by reason of vibrational instability due to gyroscopic excitation. In the latter case, these vibrations may become of such magnitude that it is impossible to control the car and the occupants are unnecessarily exposed to the liability of serious bodily injury.

There are two distinct types of shimmy, the first being a slow-speed shimmy or wobble, which is merely a turning of the front wheels from one side to the other side at any vehicle speed up to perhaps thirty miles per hour; and the second is a high-speed shimmy, which is evidenced by a violent lateral oscillation of the wheels accompanied by a violent tramping of the axle in a vertical plane around a longitudinal axis. This later type of shimmy is usually most prominent at speeds of from thirty to seventy miles per hour.

The slow-speed shimmy is caused by worn or bent parts, such as drag-link and tie-rod connections, king-pin bearings, wheels, tie-rods and axles. Since these are in the main mechanical defects, they may be easily remedied by correcting the parts which are at fault. On the other hand, the high-speed shimmy results, not from any particular errors or defects in the vehicle structure, but from a myriad of forces which are present in the modern car. Among the principal causes of high-speed shimmy are: gyroscopic action, periodicities of vibrations and the effect of the tires.

Since shimmy or wobble is primarily a problem having to do with vibration, it is apparent that the violence of the vibrations is governed to a large degree by the natural periodic vibration characteristics of the wheel assembly. With this in mind, the present invention seeks to oppose the setting-up of the vibrations at their source. To this end, the invention provides right-hand and left-hand tires for the front wheels of the automobile, these tires having different natural periods of vibration, whereby an unbalanced rather than a balanced condition is established.

Other objects and features of this invention will more fully appear from the following detailed description taken in connection with the accompanying drawing which illustrates several embodiments thereof, and in which Figure 1 is an enlarged fragmentary plan view of the front end running gear of an automobile having tires embodying the features of this invention mounted on the wheels;

Figure 2 is a fragmentary perspective view of a tire embodying this invention and having a transverse section showing a preferred form of construction;

Figure 3 is a similar view showing a modified form of construction;

Figure 4 is a transverse sectional view showing another modified form of construction; and Figure 5 is a fragmentary longitudinal section of the modified construction shown in Figure 4, taken substantially on line V—V of Figure 4.

As shown on the drawing:

In order that my invention may be more clearly understood, there is shown in Figure 1 the usual form of running gear for the front end of an automobile. This portion of the running gear comprises side frame members 10 and 11 which are secured in the usual manner through springs 12 and 13 to a front axle 14 of the automobile. Steering knuckles 15 are pivotally mounted at the ends of the axle 14, these steering knuckles being provided with spindles upon which the wheels are rotatably mounted. These spindles are provided with steering arms 16 which are interconnected by means of a tie-rod 17. One of the steering knuckles, in this case the left-hand steering knuckle, is provided with an additional steering arm 18 which is connected to a drag-link 19. The drag-link 19 is operatively connected to a vertical steering gear arm or pitman arm 20 which is associated with the steering mechanism.

It is the present practice to provide entirely similar tires, that is, tires of the same dimensions and weight, which may be used either on the right or left hand front or rear wheels as desired. Since the present tires are similarly constructed, it is evident that they will have the same natural period of vibration. Moreover, when these tires are mounted on the front wheels of the automobile, the vibrations of the right and left front wheel tires will reach their natural period of vibration at the same time, and since the steering knuckles are interconnected through the tie-rod 17, the vibrations of one wheel will be added to the vibrations of the other wheel.

The present invention, therefore, contemplates the provision of right and left hand tires for the front wheels of the automobile, these tires being so constructed that they will have different natural periods of vibration. By this arrangement, an unbalanced condition rather than a balanced condition is established. When one of the tires, for example, the right-hand tire reaches a point of natural vibration, the left-hand tire has either passed through or has not yet reached its point of natural vibration. One of the tires, therefore, will act to dampen the vibration in the other tire, thereby removing the cause of shimmy at its source.

In Figure 2, there is shown one form of construction, whereby the radius of gyration of the tire and likewise the wheel upon which the tire is mounted is brought more closely to the axis of rotation. It will be observed in this construction that the peripheral thickness of the tire is made of increased thickness as shown at 21. This thickness may be of any value so long as the radius of gyration, and therefore, the natural frequency of vibration of the tire on one of the front wheels is not the same as that on the other front wheel.

In Figure 3, there is shown a modified form of construction wherein the natural period of vibration of the tire is varied by the addition of an inner circumferential bead 22.

In Figure 4, there is shown a tire having a plurality of internal beads 23 and 24, which for purposes of illustration are shown as being arranged in a criss-cross manner on the interior surface of the tire. While several modifications are shown, it is contemplated that any internal structure may be used as between a right and left hand tire so long as the structure affects right and left hand tires having different relative natural periods of vibration.

This invention therefore provides a novel tire structure, whereby right and left tires may be provided for the front wheels of an automobile, these tires having different natural periods of vibration, thereby removing the cause of shimmy at its source.

Now, it is of course to be understood that although I have described in detail the several embodiments of my invention, the invention is not to be thus limited but only insofar as defined by the scope and spirit of the appended claims.

I claim as my invention:

1. In combination with the steering wheels of a vehicle, means to prevent high speed shimmy comprising unequally weighted elements carried rotatable with said wheels, said weights being so distributed in each wheel as to maintain that wheel in balance and adapted to selectively vary the natural periodicities of vibration of the wheels, whereby said wheels have the same external dimensions but unequal natural periodicities of vibration.

2. In combination with the steering wheels of a vehicle, means to prevent high speed shimmy comprising road contacting elements having relatively similar external dimensions but having unequal weights, said weights being so distributed in each wheel as to maintain that wheel in balance, said elements being carried rotatable with said wheels to selectively vary the natural periodicities of vibration of the wheels, whereby a wheel and road contacting element on one side of the vehicle passes through its natural period of vibration at a different relative time than the other wheel and road contacting element.

3. In combination with the steering wheels of a vehicle, means to prevent high speed shimmy comprising balanced tires carried rotatable with said wheels and having relatively similar external dimensions but different radii of gyration to selectively vary the natural periodicity of variation of the wheels, whereby said wheels and tires have unequal natural periodicities of vibration.

KENNETH E. LYMAN.